United States Patent [19]

Gasparre

[11] Patent Number: 5,367,925
[45] Date of Patent: Nov. 29, 1994

[54] ANTI-CRIMP WRENCH FOR A GARDEN HOSE

[75] Inventor: Pasquale Gasparre, East Patchogue, N.Y.

[73] Assignee: Pasquale Gasparre DBA Creative Designs in Wood and Metal, E. Patchogue, N.Y.

[21] Appl. No.: 69,537

[22] Filed: Jun. 1, 1993

[51] Int. Cl.$^5$ .............................................. B25B 13/06
[52] U.S. Cl. ................................. 81/121.1; 81/124.3
[58] Field of Search .......................... 81/121.1, 124.3

[56] References Cited

U.S. PATENT DOCUMENTS

| | | | |
|---|---|---|---|
| 1,778,576 | 10/1930 | Walker | 81/124.3 X |
| 2,733,937 | 2/1956 | Mowrer | 81/124.3 X |
| 4,058,031 | 11/1977 | Magarian | 81/64 |

FOREIGN PATENT DOCUMENTS

| | | | |
|---|---|---|---|
| 2605918 | 5/1988 | France | 81/121.1 |
| 2554315 | 6/1976 | Germany | 81/121.1 |

OTHER PUBLICATIONS

Packaging of purchased Formula Z7 Radial garden hose manufactured by Anchor Swan, Inc. of Bucyrus, Ohio, Walnut, Calif.

*Primary Examiner*—James G. Smith
*Attorney, Agent, or Firm*—Alfred M. Walker

[57] ABSTRACT

An anti-crimp wrench is provided for a flexible garden hose wherein the anti-crimp wrench has a longitudinally extending ferrule sleeve body portion further having a cap engageable with a garden hose coupling attachable to the end of the garden hose. The cap extends at the distal end of the ferrule sleeve and is engageable over the coupling for tightening the coupling upon a hose faucet bib. The interior of the cap collar of the ferrule sleeve has a plurality of rigid equidistant distinct inner surfaces adapted to conform to the exterior surface of the hose coupling, when the hose coupling is engageable over the faucet bib, threaded portion. The longitudinally extending ferrule sleeve has a plurality of longitudinally extending outer surfaces to facilitate the manual griping of the ferrule sleeve by the whole hand of the user. The ferrule sleeve is slightably moveable about the garden hose along a predetermined longitudinal length, between an annular stop, which stops the movement of the ferrule sleeve, and the hose coupling.

7 Claims, 3 Drawing Sheets

ANTI-CRIMP WRENCH FOR A GARDEN HOSE

FIELD OF THE INVENTION

The present invention relates to a wrench and anti-crimp device for better hand gripping for locking and unlocking of a garden hose from a garden hose bib faucet.

BACKGROUND OF THE INVENTION

Lawn gardeners must repeatedly install and remove hoses which provide water to sprinklers, nozzles, and other water supply devices, such as lawn games often the connection between the water faucet bib is never completely tight, so that there occurs frequently leaks and the difficulties in irrigating with water.

Moreover it is known that water hose fittings are very difficult to manipulate manually with the fingers only, often requiring both manual dexterity and brute strength, in odd work places in tight spots close to the ground which the gardener may encounter.

Efforts to ease the installation of garden hose couplings are described in U.S. Pat. No. 4,058,031 of Magarian, which discloses a flexible wrench collar with laterally extending protrusions located equal distantly about the wrench collar. However, considerable manual force is needed, since only the users fingers engage the collar.

What is needed, and what is not shown in the prior art, is a wrench adapter for a garden hose which enables a whole hand to be used to tighten or untighten the garden hose faucet coupling.

OBJECTS OF THE INVENTION

An object of the present invention is to provide an approved wrench for garden hoses.

A further object is to facilitate the easier engagement and disengagement of garden hoses. There's a further object to provide a wrench making it easier to tighten with the whole hand of the user.

It is yet another object to provide a wrench which can be effectively used with a minimum of manual effort.

It is a further object to provide a garden hose wrench which prevents the hose from bending excessively in a crimp and which prevents leaks at the connection of the female connector of the garden hose coupling.

It is a further object of the present invention to provide a garden hose wrench which can be easily adapted and removed from the garden hose coupling.

It is a further object to provide a garden hose wrench which improves over the prior art.

In keeping with these objects and others which will become apparent, there is provided a novel garden hose anti-crimp wrench, as shown in the following drawings.

DESCRIPTION OF THE PREFERRED EMBODIMENTS

Figure 1:
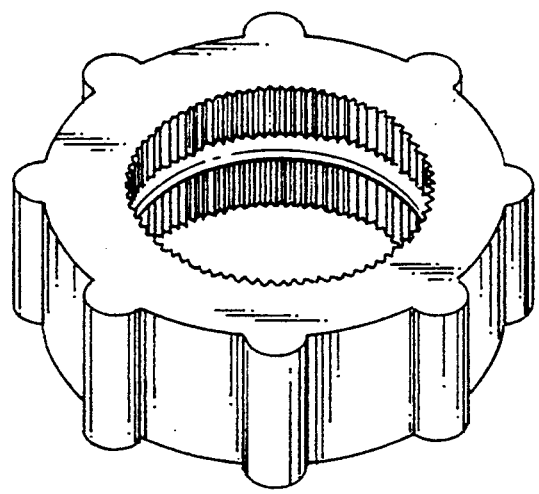
FIG. 1 is a perspective view of a prior art hose wrench.
Figure 1A:
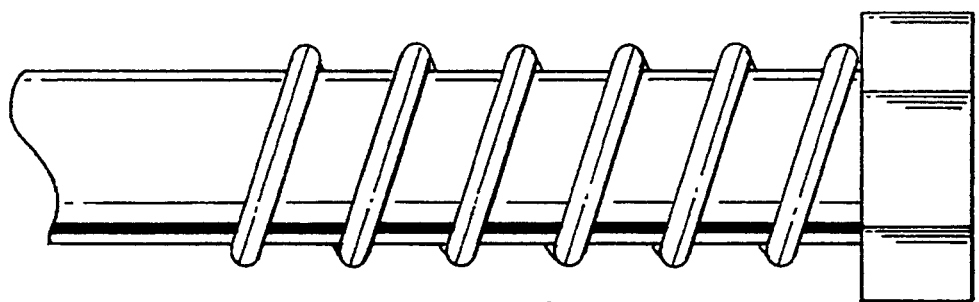
FIG. 1A is a side elevational view of a prior art anti-crimp device.
Figure 2A:
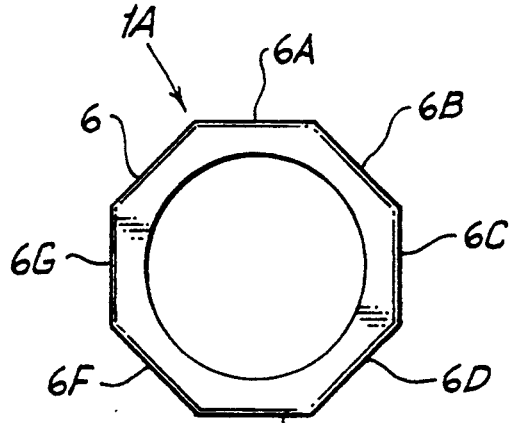
FIG. 2A is a top plan view of a prior art garden hose coupling.
Figure 2:
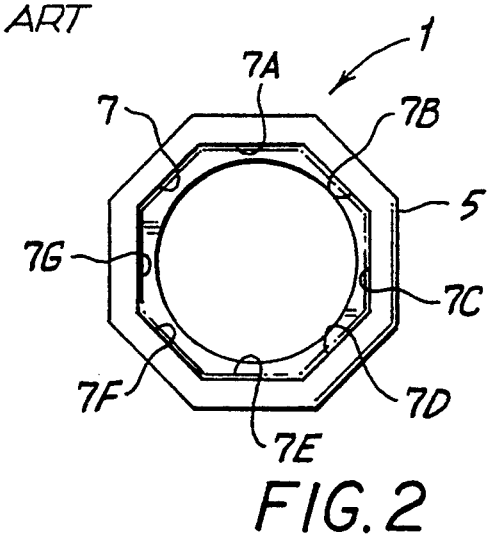
FIG. 2 is a top plan view of a garden hose wrench according to the present invention.
Figure 3:
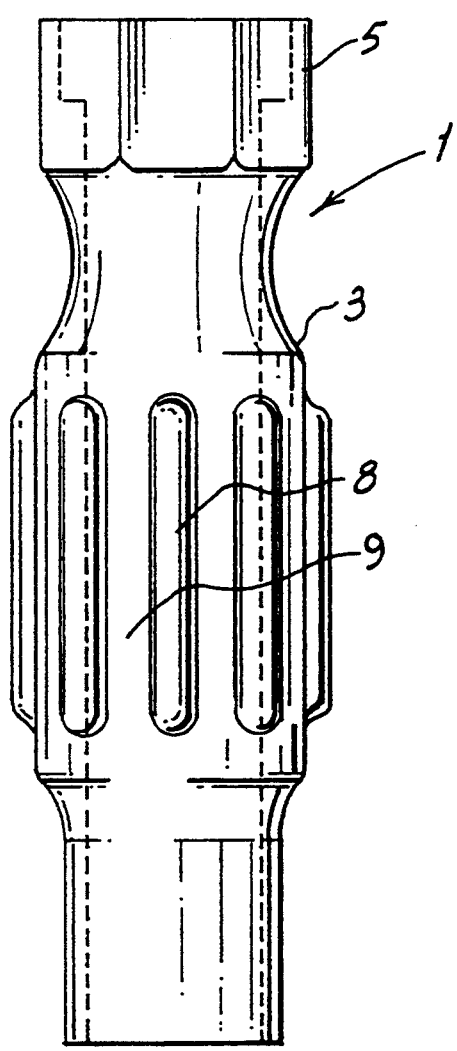
FIG. 3 is a side elevational view of the wrench as shown in FIG. 2.
Figure 4:
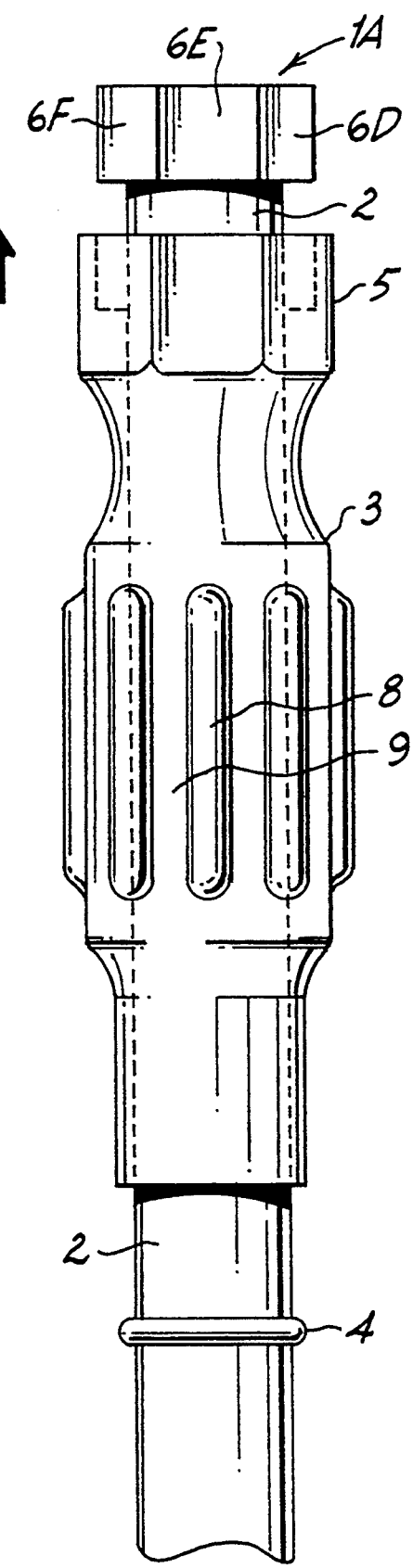
FIG. 4 is a side view in partial section view present invention lowered from the garden hose bib fitting.
Figure 5:
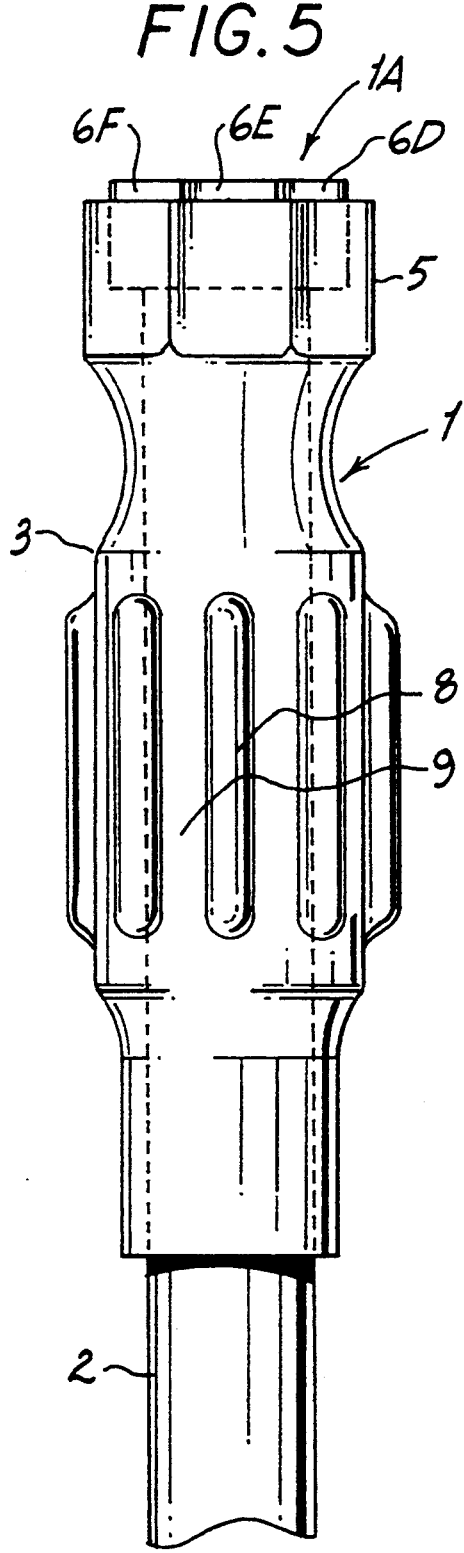
FIG. 5 is a side elevational view of the present invention in use.
Figure 6:
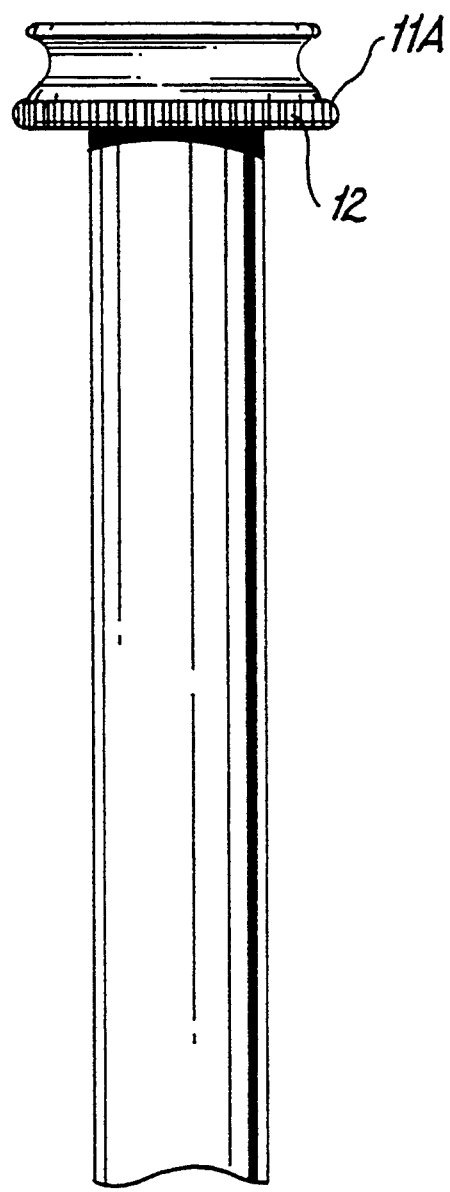
FIG. 6 is a side elevational view in partial section of a prior art of a knurled garden hose fitting.

Referring to the drawing FIGS. 2–5, the garden hose wrench in the present invention is generally shown as 1. Shown in FIG. 5, wrench 1 mounts upon a coupling 1A of a hose 2.

As shown in the drawings, the wrench 1 includes a ferrule sleeve 3 slidably mounted over the hose 2, which wrench 1 is stopped from longitudinal movement by an annular stop 4. Coupling 5, is insertable over a conventional octagon shaped hose coupling 1A of a garden hose 2.

The ferrule sleeve 3 is slidable about the hose to couple and uncouple the generally octagon shaped coupling 1A. Other couplings may have other shapes, such as hexagon or similar polygon shapes and wrench 1 may be also adapted and made to fit these other shapes. The coupling 1A of the garden hose 2 has on it's exterior generally an equidistant plurality of surfaces 6–6G which form a octagon on the exterior of the surfaces 6–6G. Coupling 1A is threaded to engage a conventional garden hose faucet bib. The exterior of the surfaces 6–6G of coupling 1A engages with the interior collar cap portions 7–7G of the ferrule sleeve 3 so that manual pressure with the whole hand may be brought upon the coupling 1A by manual movement of the ferrule sleeve 3, clockwise or counterclockwise to engage or disengage the surfaces of the coupling 1A.

The interior surfaces 7–7G of the cap collar 5 of the ferrule sleeve 3 are rigid, so that when the ferrule sleeve 3 is fitted externally over the hose coupling 1A, the cap collar 5 is engaged to press upon the exterior surfaces of the hose coupling 1A tightly so that the hose coupling 1A may be loosened or tightened as needed. It is generally made of a rigid material which does not break under stress. The ferrule sleeve 3 has the forward end collar 5 at one end, which collar 5 is tapered or reduced at a proximal end to the ferrule sleeve 3 at the top of the sleeve 3.

The exterior of the ferrule sleeve 3 may have longitudinal extending ridges 8, or depressions 9, to facilitate the manual griping of the ferrule sleeve wrench 1 about the coupling 1A of the hose 2.

In use, the ferrule sleeve 3 is slidably mounted upon the hose coupling 1A. The forward cap collar 5 of the ferrule sleeve 3 is moved against the outer end of the hose coupling 1A so that the inner surfaces 7–7G of the cap collar 5 move the sleeve 3 upon the coupling 1A. The ferrule sleeve 3 is open at both ends and the hose sleeve is slidable longitudinally about the axis of the flexible garden hose 2, between the coupling 1A to be tightened or loosened, and the annular ring stop 4, to prevent the movement of the ferrule sleeve 3 below a predetermined longitudinal length of the hose 2.

Because the ferrule sleeve 3 is moveable about the hose 2, it can be easily detached or attached to the coupling 1A for tightening or loosening of the coupling 1A of the hose 2 about faucet bib attached to a house or other water source.

As noted, the ferrule sleeve 3 is open at both ends. At the upper end, the ferrule sleeve 3 extends to encompass the cap collar 5 portion for engagement upon an octagon shaded coupling 1A of a garden hose.

In the preferred embodiment, shown in FIGS. 2-5, wrench 1, which is engageable upon the octagon shaped hose coupling 1A, and the cap collar 5 engages over the surfaces tightly of the hose coupling 1A for frictional engagement. When mounted, the exterior ferrule sleeve 3 of the wrench 1 can be easily held and turned with the whole hand, not just by the fingers of the prior art devices.

The manual engagement forces imparted upon the ferrule sleeve 3 serve to cause the cap collar surfaces 7-7G to engage against the octagon shaped hose coupling 1A so that the coupling 1A may be tightened about the faucet bib respectively. It may also respectively be loosened in a likewise reverse manner.

The extended longitudinal length of the ferrule sleeve 3, also acts as an anti-crimp device by maintaining the flexible hose 2 in a generally straight longitudinal position from the point of the coupling until the longitudinal length of the ferrule sleeve 3, which is the most usually crimped, or bent portion of a garden hose 2, namely at the coupling or within the vicinity thereof. Thus, the ferrule sleeve 3 acts as a wrench to loosen or tighten the coupling 1A from the faucet, but also, as a anti-crimp device to maintain the hose 2 in a generally straight longitudinal direction away from the hose without any impeding bends or crimps in the flexible hose 2.

Other modifications may be made to the present invention, without departing from the spirit or scope of the present invention, as noted in the appended claims.

I claim:

1. A hose extension and wrench combination for a garden hose, comprising:
    a. a hose extension having a threaded male end and a threaded female end, said threaded female end having a polygonal coupling portion for tightening and loosening said threaded female end about a remote complimentary threaded male end; and
    b. a body sleeve wrench portion slidably receivable about said hose extension between said threaded male end and said threaded female end; said body sleeve wrench portion having a complimentary polygonal coupling portion at one end sized to slidably engage and rotatably turn said polygonal coupling portion of said threaded female end of said hose extension, to selectively tighten and loosen said threaded female end of said hose extension from the remote complimentary threaded male end.

2. The hose extension and wrench combination of claim 1 wherein said polygonal coupling portion is hexagonal.

3. The hose extension and wrench combination of claim 1 wherein said polygonal coupling portion is octagonal.

4. The hose extension and wrench combination of claim 1 further comprising an annular stop ring surrounding said hose extension, said annular stop ring being located around said hose extension at a predetermined distance from said threaded male end of said hose extension, to permit said body sleeve portion to move slidably about said hose extension between said annular stop ring and said polygonal coupling portion of said female end of said hose extension.

5. The hose extension and wrench combination as in claim 1, wherein said body sleeve wrench portion includes a plurality of longitudinally extending ridge surfaces for facilitating the manually gripping of said body sleeve wrench portion with a palm gripping portion of a hand of a user.

6. The hose extension and wrench combination as in claim 5, wherein said longitudinally extending ridge surfaces of said body sleeve wrench portion include a plurality of longitudinally extending protrusions.

7. The hose extension and wrench combination as in claim 5, wherein said longitudinally extending ridge surfaces of said body sleeve wrench portion include a plurality of longitudinally extending depressions.

* * * * *